United States Patent
Hazelton et al.

[19]

[11] Patent Number: 6,140,734
[45] Date of Patent: *Oct. 31, 2000

[54] ARMATURE WITH REGULAR WINDINGS AND HAVING A HIGH CONDUCTOR DENSITY

[75] Inventors: Andrew J. Hazelton, San Carlos; W. Thomas Novak, Hillsborough, both of Calif.

[73] Assignee: Nikon Corporation of Japan, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/054,766

[22] Filed: Apr. 3, 1998

[51] Int. Cl.[7] ............... H02K 3/04; H02K 3/47; H02K 9/00; H02K 7/197

[52] U.S. Cl. ............... 310/198; 310/12; 310/58; 310/86; 310/208

[58] Field of Search ............... 310/12, 198, 268, 310/114, 208, 194, 195, 64, 54, 86, 52; 318/135

[56] References Cited

U.S. PATENT DOCUMENTS

| | | | |
|---|---|---|---|
| Re. 34,674 | 7/1994 | Beakley et al. | 310/12 |
| 3,903,437 | 9/1975 | Mori | 310/12 |
| 4,051,398 | 9/1977 | Kondo | 310/12 |
| 4,151,447 | 4/1979 | von der Heide et al. | 318/135 |
| 4,172,229 | 10/1979 | Guimbal | 310/13 |
| 4,318,038 | 3/1982 | Munehiro | 318/135 |
| 4,394,594 | 7/1983 | Schmider et al. | 310/68 R |
| 4,451,749 | 5/1984 | Kanayama et al. | 310/62 |
| 4,767,954 | 8/1988 | Phillips | 310/12 |
| 4,839,543 | 6/1989 | Beakley et al. | 310/12 |
| 5,087,844 | 2/1992 | Takedomi et al. | 310/12 |
| 5,107,366 | 4/1992 | Huang et al. | 359/223 |
| 5,212,416 | 5/1993 | Shimizu et al. | 310/12 |
| 5,497,038 | 3/1996 | Sink | 310/12 |
| 5,519,266 | 5/1996 | Chitayat | 310/12 |
| 5,536,983 | 7/1996 | Araki et al. | 310/12 |
| 5,744,896 | 4/1998 | Kessinger et al. | 310/268 |
| 5,783,877 | 7/1998 | Chitayat | 310/12 |

*Primary Examiner*—Karl Tamai
*Attorney, Agent, or Firm*—Morrison & Foerster LLP

[57] ABSTRACT

Regular windings for use in an armature in an electric motor. Windings, each having approximately the same shape as a regular winding, may be overlapped to increase a conductor density within a volume encompassing portions of the windings by having a portion of each winding at least partially fill an aperture of an adjacent overlapping winding. The windings are associated with phases used to operate an electric motor. The windings and armature should be particularly useful in linear electric motors and in steppers used in semiconductor manufacture. Windings of the same shape improve manufacturability of the armature and electric motor. High conductor densities in the windings significantly improve efficiency of the electric motor.

20 Claims, 18 Drawing Sheets

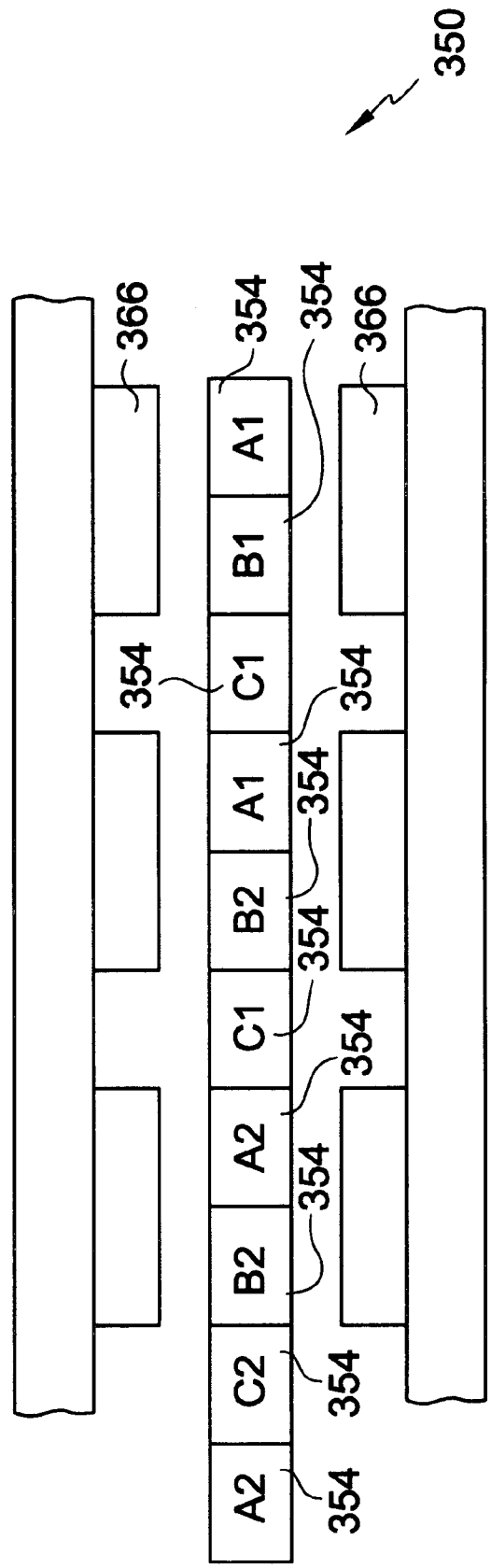

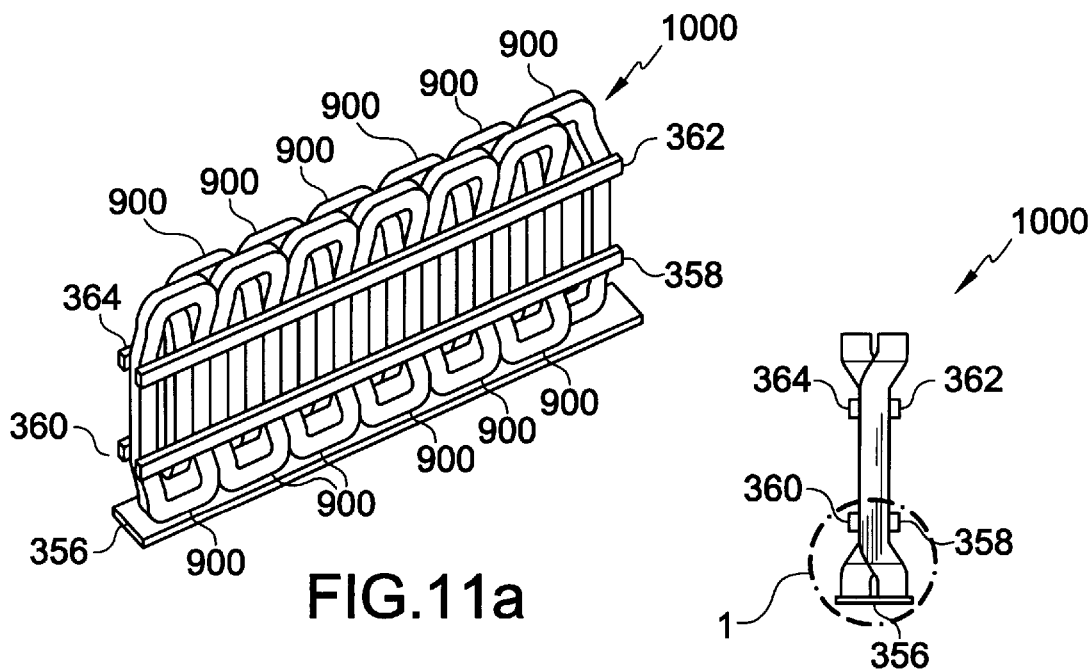
FIG.11a
FIG.11c
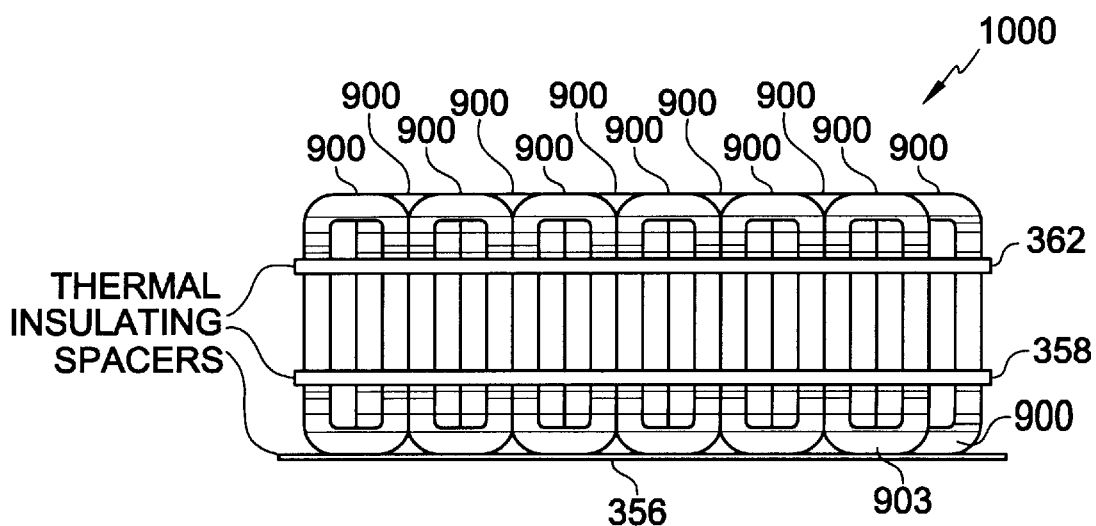
FIG.11b

RIGID MECHANICAL HEADER 6,140,734

ARMATURE WITH REGULAR WINDINGS AND HAVING A HIGH CONDUCTOR DENSITY

TECHNICAL FIELD

The invention relates generally to conductor windings and more specifically to conductive winding as used in electric motors.

BACKGROUND ART

Electric motors arm used in a variety of electrical equipment. In particular, they are used in various manufacturing equipment. For example, linear electric motors produce electrical power that propels an annature in one dimension. Wafer stages positioning silicon wafers during photolithography and other semiconductor processing equipment utilize linear electric motors to position the wafer.

A typical linear electric motor has a magnet track with pairs of opposing magnets facing each other. Within spaces between the pairs of opposing magnets, an armature moves. The armature has windings of a conductor which are connected to an electrical current. When the electrical current is turned on, electromagnetic fields arc created within the windings. Those electromagnetic fields interact with the magnetic fields of the magnet pairs to cause the armature to move. When the armature is attached to a wafer stage, the wafer stage moves in concert with the armature, FIGS. 1a and 1b Illustrate a conventional magnet track 100 used in an electric motor. FIG. 1a is a perspective view of the magnet track 100, and FIG. 1b is a cross-sectional front view of the magnet track 100. The magnet track 100 has pairs of opposing magnets 102 along the length of the magnet track 100. An armature is inserted into the magnet track and is powered by electrical current to cause the armature to move with respect to the magnet track 100.

In a multiphase motor, the armature has various windings grouped into phases. The phase groups are selectively pulsed with electric current to create a more efficient motor. As the armature moves within the magnet track 100 as a first group of coils is pulsed, the first group moves out of its optimal position between the pairs of magnets 102. Then, it becomes more efficient to pulse a second group of windings. More phase groups are theoretically more efficient since a more even application of force and utilization of power input is maintained. However, each additional phase group complicates a timing of the pulses to the various phase groups. Presently, three-phase motors and armatures have gained favor in balancing these considerations.

Two examples of conventional multi-phase electric motors are given in the patents to Beakley et al. (U.S. Re. 34,674) and Phillips (U.S. Pat. No. 4,767,954) both of which are incorporated by reference herein in their entirety. Both patents illustrate conventional manufacturing difficulties. Beakley et al. has multiple sizes of individual windings which make up the armature. For example, FIG. 5 in Beakley et al., shows an arrangement of windings requiring an intricate placement of the different size windings with respect to each other. A requirement for multiple sizes of windings complicates manufacture of the armature, and hence the motor, since each size winding would typically have a separate manufacturing process for its construction. In addition, it may be more difficult to align windings of different shapes or sizes.

Although Phillips teaches an armature where all the windings have the same regular shape, the Phillips windings must be carefully aligned. FIG. 2 in Philips shows the alignment of windings to make up the Phillips armature. Similarly, FIG. 2 in the present application shows a top cross-sectional view of the magnet track 100 and an annature 200 in accordance with Phillips. In FIG. 2, corresponding phases have the same letter, and cross-sections which are part of the same winding have the same number. For example, cross-sections labeled A0, A1, A2, and A3 are part of the same phase group. Similarly, cross-sections B0, B1, B2, and B3 are part of another phase group, and cross-sections C0, C1, C2, and C3 are part of a third phase group. A winding such as A1 has a low side 202 aligned with a high side 204 of an adjacent winding A2 in the same phase group. Similarly, a low side 206 of A2 is aligned with a high side 208 of A3 in the same phase group. All the windings in all the phase groups A, B, C are aligned in this fashion. Misalignment of windings will cause inefficiencies in the motor's operation.

By having the conductor density in the armature residing between the pairs of opposing magnets as high as possible, high efficiency of the electric motor, measured as force output compared with a square root of power dissipation in the windings, is obtained.

What is needed is an armature with regular windings of all the same shape that also maximize a wire density within the magnet gap. Such regular windings would improve manufacturability while providing high efficiency of the motor.

SUMMARY OF THE INVENTION

The invention features a regular winding for use in an armature in an electric motor. Windings, each having approximately the same shape as the regular winding, may be overlapped to substantially maximize a conductor density within a simply connected volume encompassing portions of the windings by having a portion of each winding at least partially fill an aperture of an adjacent overlapping winding. The windings may be associated with phases used to operate the electric motor.

The regular winding includes a conducting coil having two parallel sides and having an aperture between the sides. A thickness of the sides is equal to a width of the armature. In some embodiments, the aperture has a width which is approximately equal to an integer multiple of the thickness.

An advantage of this invention is that it significantly increases the density of conductor within a magnet gap in the electric motor and thereby improves the efficiency of the electric motor. In some embodiments, the regular conductor windings are precision wound or pressed together putting the conductor in a close-packed arrangement. This result in a high number of wires between magnets in the electric motor.

Another advantage of this invention is that all of the individual coils are approximately the same. This makes the armature and motor simpler to manufacture. By having one shape for several or all of the regular conductor windings in the annature or motor, problems of precise alignment of windings, particularly in a multiphase armature, are obviated. The invention's multiphase armature does not require two windings of the same phase to overlap and align as in conventional design.

The invention should be particularly useful for linear electric motors. Various types of equipment use linear electric motors. For example, steppers in photolithography equipment move a wafer stage relative to a light source. The steppers may contain linear electric motors. Linear electric motors are also used in elevators, electric razors, mechanic tools such as metal cutting machines and inspection machines, and disk drives.

These and other objects, features, and advantages of the invention will become readily apparent to those skilled in the art upon a study of the following drawings and a reading of the description of the invention below.

BRIEF DESCRIPTION OF THE DRAWINGS

FIG. 4 is a top cross-sectional view of an embodiment of an electric motor in accordance wit the present invention.

FIG. 6 is a flow chart fiber describing the step of making the individual windings as shown in. FIG. 5 in accordance with the present invention.

FIGS. 11a–11c illustrate an embodiment of a winding assembly using the regular winding shown in FIGS. 9a–9d in accordance with the present invention.

DESCRIPTION OF THE INVENTION

The invention includes regular windings that can be used in an armature. The armature can be used in an electric motor. When the regular windings and the armature are in the electric motor, they achieve a high conductor density within a volume containing portions of the regular windings which resides between spaces formed by pairs of magnet in a magnet track. The invention should have particular use in linear electric motors. Using regular windings enhances manufacturability of the armature. Increasing the conductor density improves efficiency of the electric motor.

As used herein, an adhesive substance or material is construed to mean anything capable of attaching, binding, or fastening objects to each other. Adhesive substances and materials include, but are not limited to, glue, epoxy, cement, cyanoacrylata, room temperature vulcanizing silicone, and tape.

As used herein, a thermal insulator is any substance or material that prevents, averts, blocks, hampers, or inhibits transfer of heat. Thermal insulators include, but are not limited to, epoxy, phenolic, plastic, wood, felt, and rubber.

For background material, the reader is directed to the following standard textbooks all of which are incorporated by reference herein in their entirety: *Permanent-Magnet DC Linear Motors*, A. Basak, Clarendon Press, 1996; *Fundamentals of Physics*, Second Edition, Extended Version, Revised Printing, David Hailiday and Robert Resnick, John Wiley & Sons, 1986; *Brushless Permanent-Magnet Motor Design*, D. C. Hanselman, McGraw-Hill, 1994; *Design of Brushless Permanent-Magnet Motors*, J. R. Hendershot, Jr. and T. J. E. Miller, Magna Physics Publishing and Clarendon Press, 1994.

First, an embodiment of an armature and an electric motor of the invention will be described. Second, a manufacturing process for making an armature of the invention will be described. Third, an embodiment of a regular winding and construction of an annature using this regular winding will be described. Finally, another embodiment of a regular winding and its use in an armature will be described.

Figure 3A:
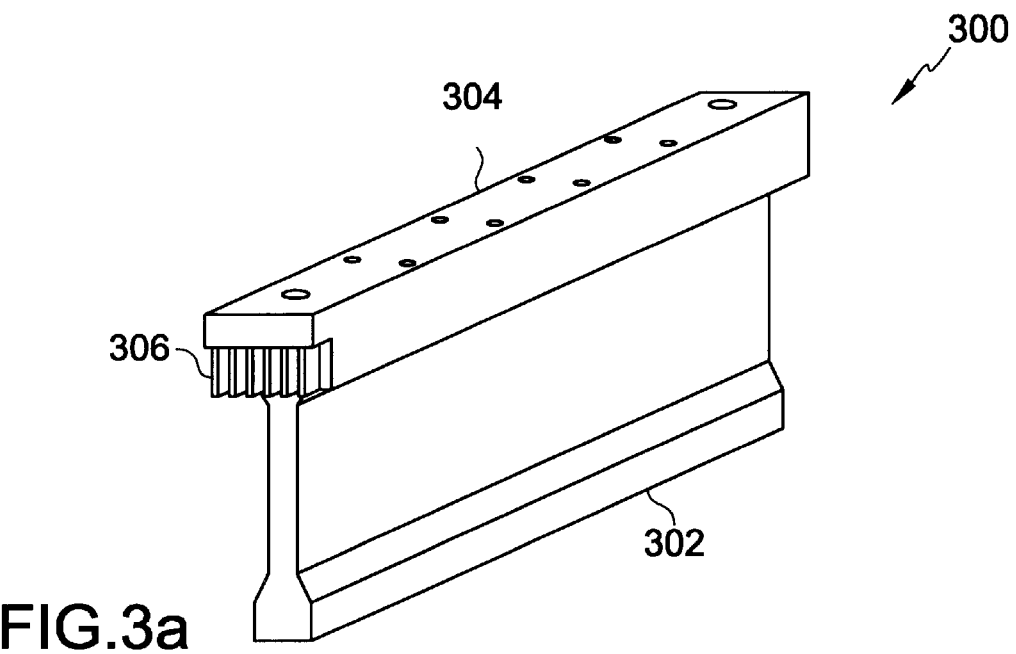
FIG. 3a is a perspective view of an armature in accordance with the present invention.

FIG. 3a shows a perspective view of an embodiment of an armature 300 in according with the present invention. In this embodiment, an enclosure 302 surrounds regular windings inside the armature 300. In some embodiments, the enclosure 302 is made from a non-magnetic stainless steel although other suitable materials may be used. The enclosure 302 may have a gap between itself and the regular windings inside the armature 300 to permit a coolant to flow over the windings inside the armature 300.

The enclosure 302 is attached to a header 304 providing support for the enclosure 302. In some embodiments, the enclosure 302 is welded to the header 304. A terminal 306 is also attached to the header 304 and electrically connected to the regular windings.

Figure 3B:
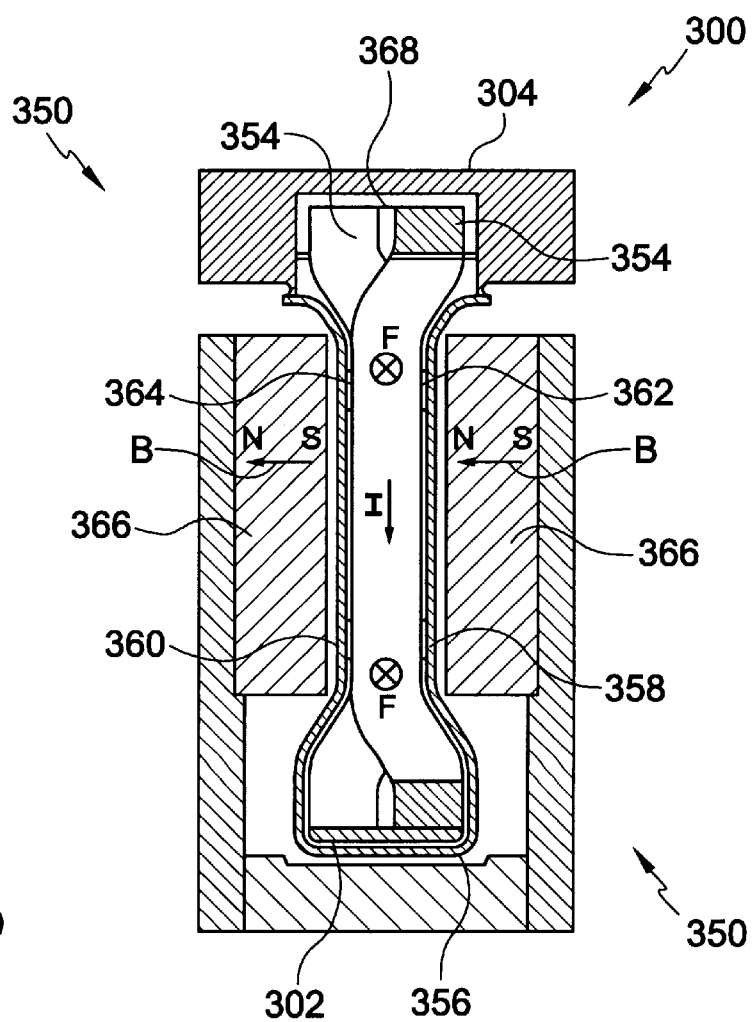
FIG. 3b is a cross-sectional front view of an armature in accordance with the present invention.

FIG. 3b shows a cross-section of an electric motor 350 having the armature 300 inserted into a magnet track 352. The armature 300 has regular windings 354 inside the enclosure 302. The regular windings 354 form a "dogbone" shape in the cross-sectional view. The enclosure 302 is spaced from the regular windings 354 by thermal insulators 356, 358, 360, 362, and 364. The thermal insulators 356, 358, 360, 362, and 364 are disposed between the regular windings 354 and the enclosure 302 to prevent heat transfer between the regular windings 354 and the enclosure 302. By creating a space between the regular windings 354 and the enclosure 302, a coolant may flow inside the enclosure 302 and about the regular windings 354. Thermal insulation is desirable to prevent heat transfer to other parts of the electric motor 350 and other equipment in proximity to the armature 300.

Figure 1A:
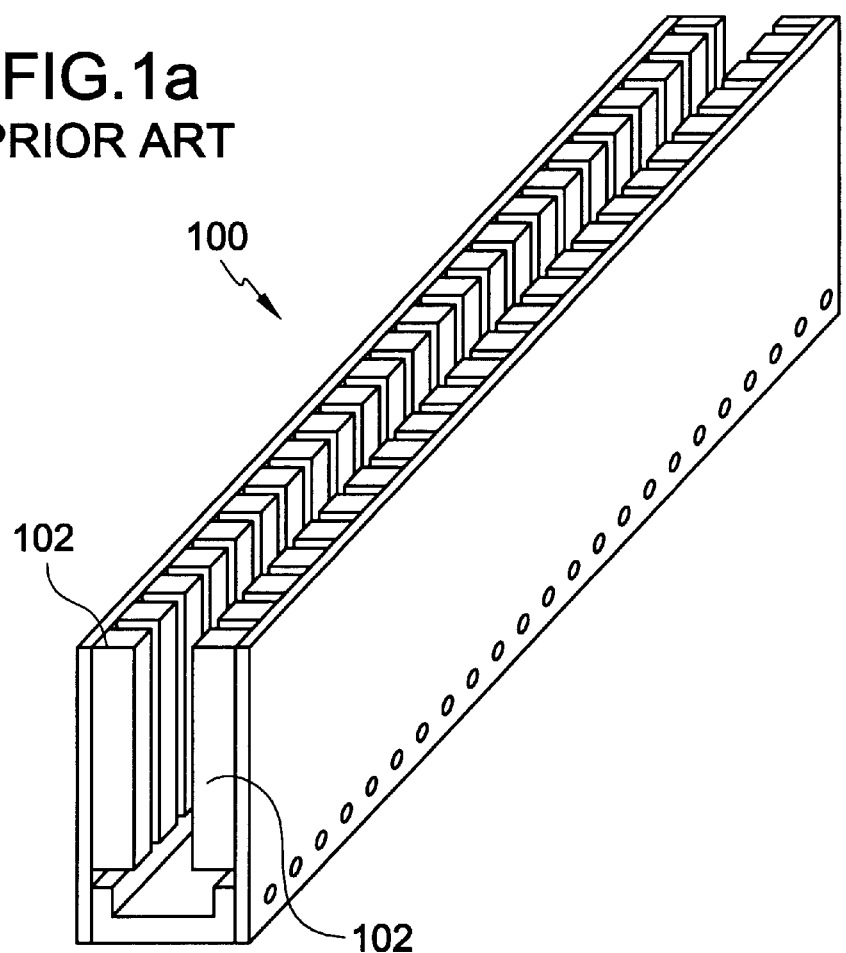
FIG. 1a is a perspective view of a conventional magnet track.
Figure 1B:
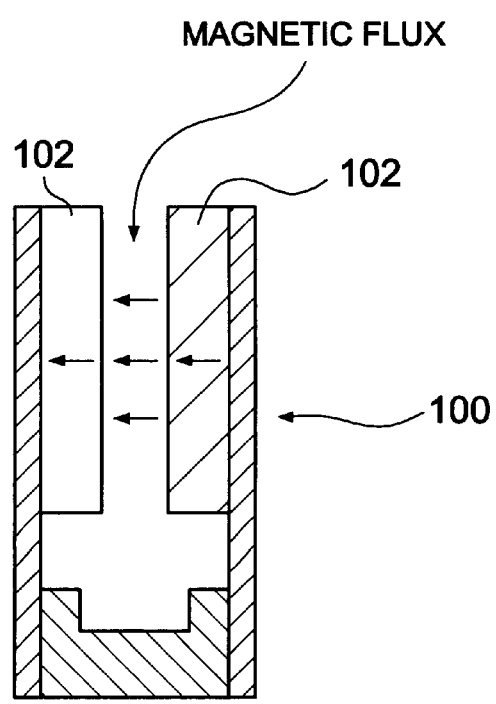
FIG. 1b is a crossectional front view of a conventional magnet track.

In the embodiment shown in FIG. 3b, the magnet track 352 has pairs of magnets 366 periodically spaced along the track as in the magnet track 100 of FIGS. 1a and 1b. Each magnet in each pair 366 faces the other magnet in the pair 366 to align their respective magnetic fields and form a space between the magnets 366.

The armature 300 is shaped to move within spaces formed by the pairs of magnets 366. The armature 300 has regular conductor windings 354 each of which has approximately the same shape. The regular conductor windings 354 are arranged in overlapping fashion to essentially maximize a conductor density within the spaces between the pairs 366 when the regular conductor windings 354 are within the spaces 366. When elect current is applied to the regular conductor windings 354, the regular conductor windings 354 emit electromagnetic fields that interact with magnetic fields of the magnet pairs 366 to cause the armature 300 to move.

In the embodiment shown in FIG. 3b, the enclosure 302 has approximately the same shape collectively formed by the regular conductor windings 354. This permits the armature 300 to maximize the conductor density within the spaces formed by the pairs of magnets 366.

The regular conductor windings 354 are attached to the header 304 by an adhesive substance 368. In some embodiments, the adhesive substance is an epoxy although other glues or adhesives may be used. Additionally, the adhesive substance 368 may thermally insulate the regular conductor windings 354 from the header 304.

FIG. 4 shows a top cross-sectional view of the electric motor 350 when it has three phases. The blocks in FIG. 4 represent cross-sections of regular conductor windings 354 as they would be arranged in the armature 300. Blocks with the sane letter are grouped into the same phase, and successive blocks with the same phase have consecutive numbers. For example, the two A1 blocks are part of one regular winding grouped in the A-phase category. The blocks A2 represent cross-sections belonging to the next regular conductor winding 354 with the same phase. Notice that regular windings having the same phase are separated from each other by other windings not having the same phase such as the B and C windings. For the embodiment in FIG. 4, the armature 300 has three phases of regular conductor windings 354. In the embodiment in FIG. 4, portions which are part of windings in a subset of windings having the same phase are separated from each other by other portions of windings not in that subset. For the particular embodiment in FIG. 4, the number of portions separating portions in the same phase is the number of phases minus one, i.e., two, for the example.

Figure 2:
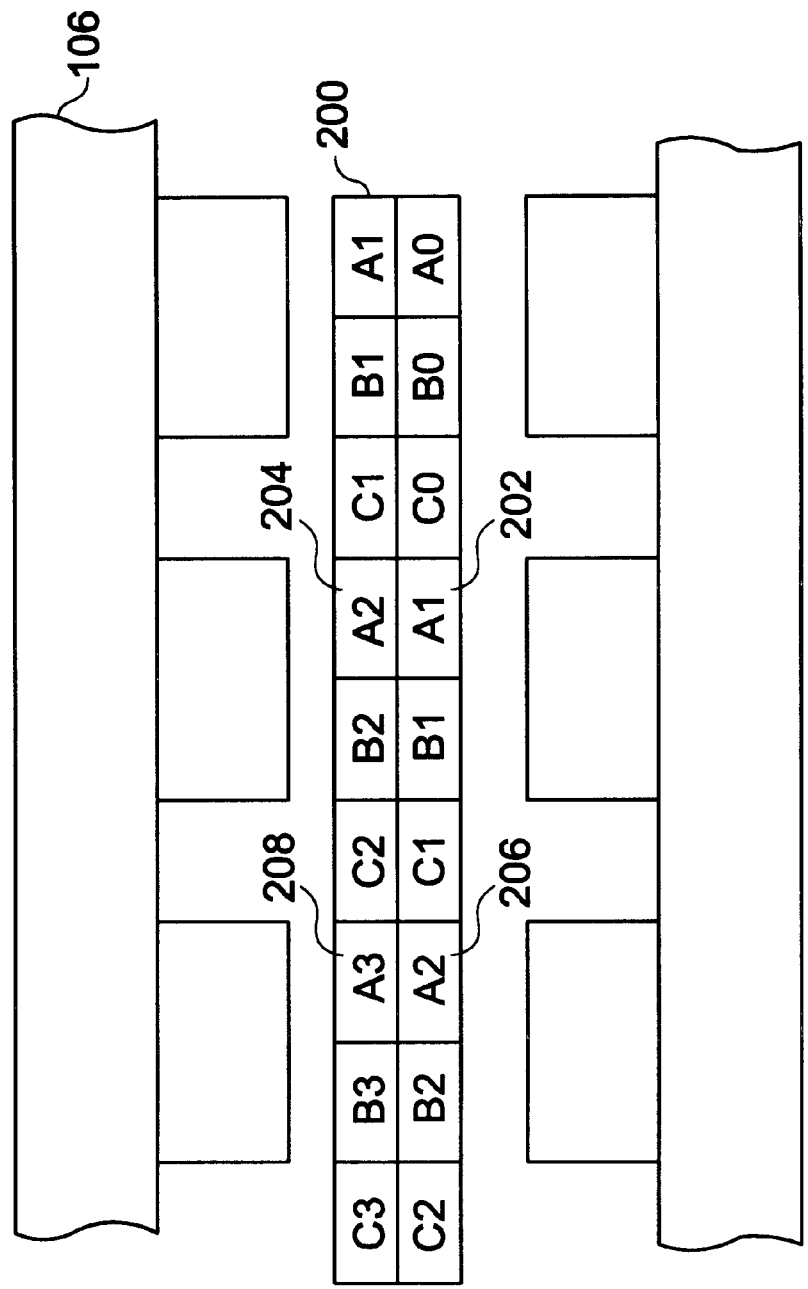
FIG. 2 is a top cross-sectional view of a conventional electric motor.

Unlike the windings in the armature 200 in the FIG. 2 according to Phillips, the windings 354 in FIG. 4 of the present invention do not require such an intricate alignment of windings 354 having the same phase. As shown in FIG. 4, a cross-section for a particular phase is followed by a cross-section for another phase and a cross-section for a third phase. Then another cross-section for the first phase occurs and so forth. On the other hand, the Phillips arrangement in FIG. 2 has cross-sections A0 and A1 which must be aligned with each other followed by cross-sections B0 and B1 which are aligned with each other and cross-section C0 and C1 which also must be aligned with each other. Then cross-sections A1 and A2 are aligned with each other and are grouped with the first phase group and so forth. This improvement in the present invention permits easier manufacturability.

Figure 5:
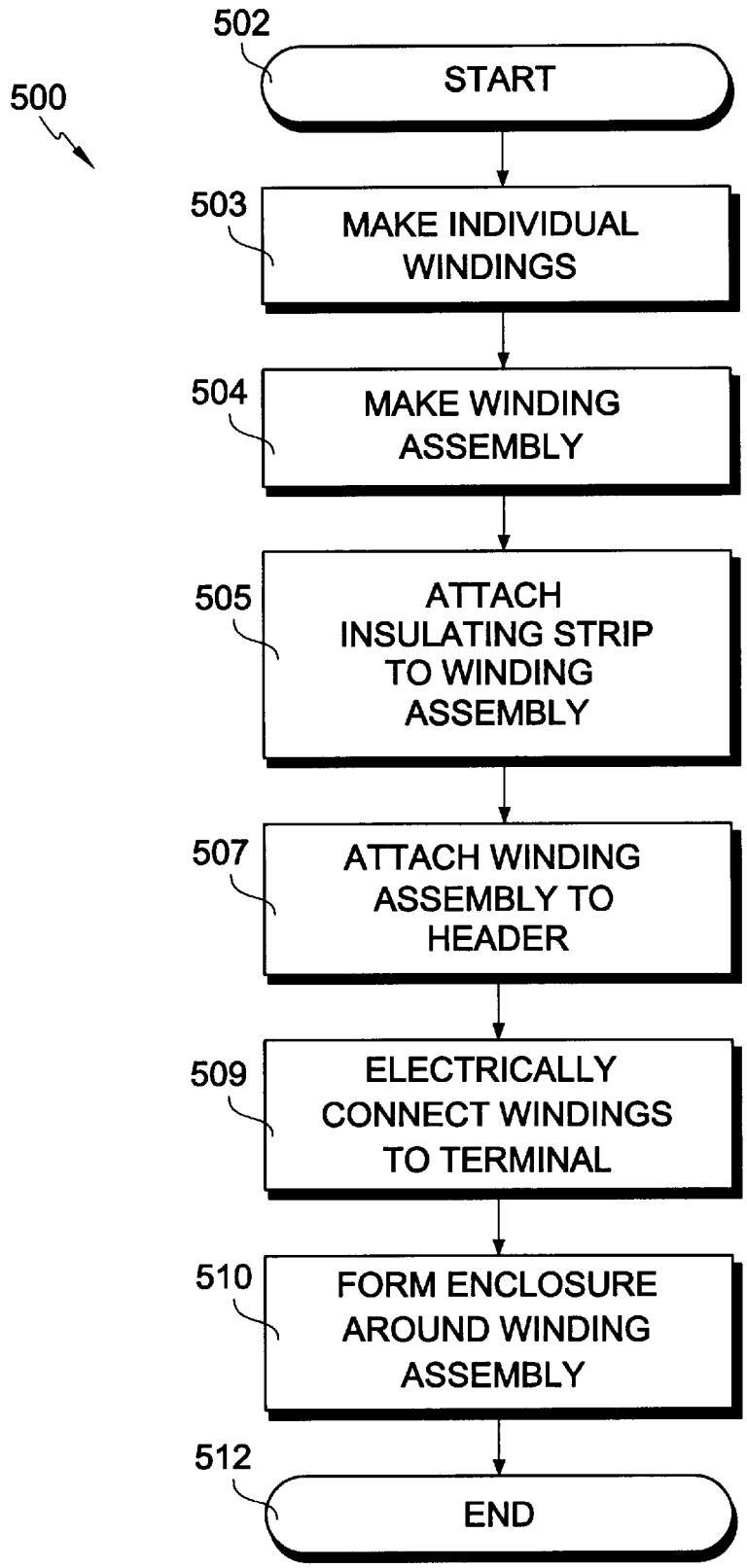
FIG. 5 is a flow chart describing a method of making an armature in accordance with the present invention.

Referring to FIG. 5, a method 500 of making an armature 300 will now be described in detail beginning with a step 502. Step 503 makes the individual regular windings 354. In a step 504, a winding assembly having two or more regular conductor windings is assembled. Once the individual regular conductor windings 354 are combined into the winding assembly, step 505 attaches one or more insulating strips such as 356, 358, 360, 362, or 364 to the winding assembly. Step 507 attaches the winding assembly into the header 304 with epoxy or another adhesive substance. In other embodiments, step 505 may occur after step 507. Step 509 electrically connects the regular conductor windings 354 to the terminal 306. Step 510 forms the enclosure 302 about the winding assembly to complete the making of an embodiment of the armature 300. The method 500 of making the armature 300 ends at a step 512.

Clearly, many other specific embodiments of the method 500 are possible. For example, many of the steps in FIG. 5 may be permuted. Additionally, not all of the steps are required to make an armature in accordance with the invention.

Figure 6:
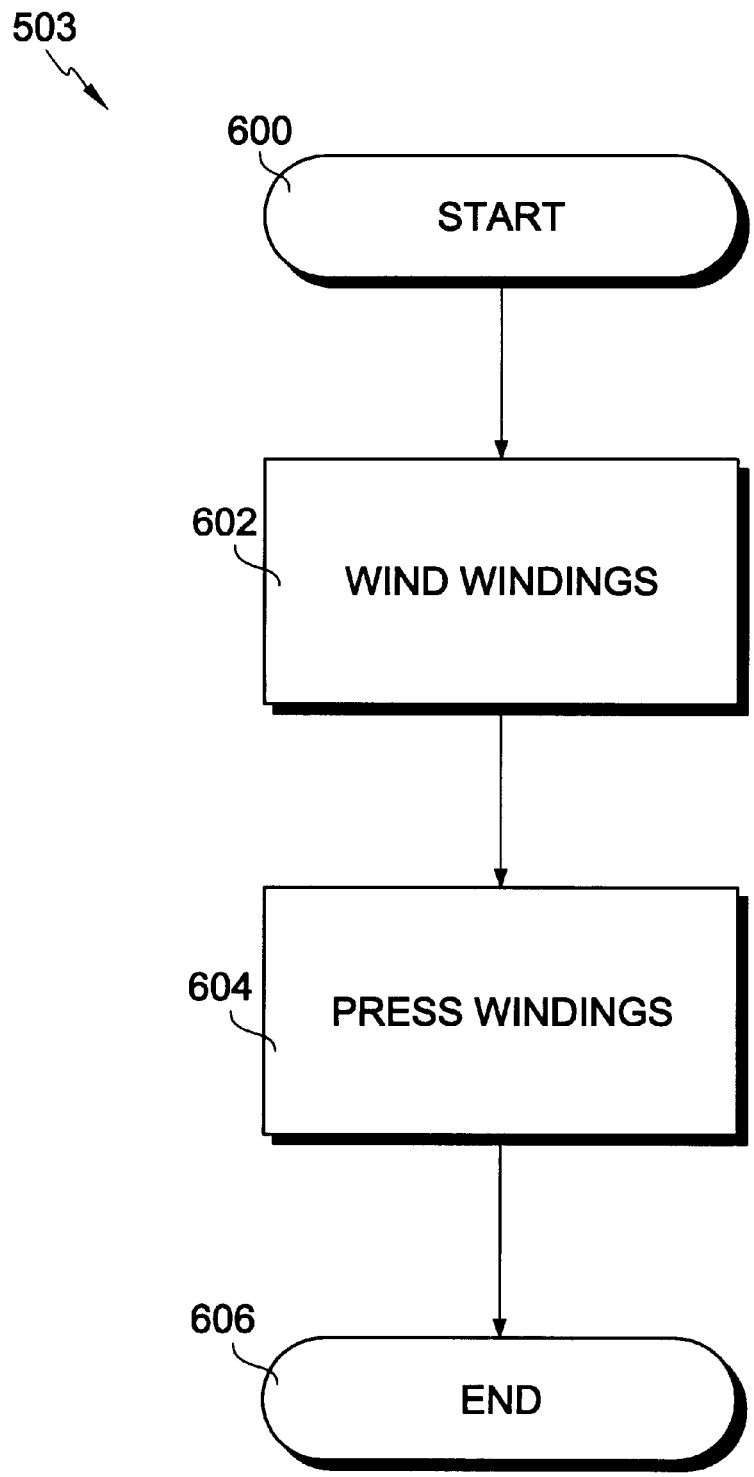

FIG. 6 shows an embodiment of step 503 for making the individual windings 354 in greater detail beginning at a step 600. Step 602 winds the regular conductor windings. In some embodiments, the step 602 will perform a precision racetrack winding of the individual regular conductor windings 354. Racetrack winding helps to maximize the conductor density within the individual regular conductor windings 354.

Step 604 presses the individual windings to further maximize conductor density within the individual windings. Step 604 can be performed in a variety of ways. Each individual winding may be pressed before being arranged to form the winding assembly, or the regular conductor windings 354 may be arranged in the approximate shape of the winding assembly and pressed in that arrangement. When pressed individually, each individual winding may be pressed while it is on a mandrel during or after the winding in step 602, or they may be pressed in molds after step 602. When pressed collectively, the individual windings 354 may have an approximate cross-sectional shape as that. indicated in FIG. 4 for three phases. The embodiment of step 503 illustrated in FIG. 6 ends at a step 606.

Figure 7:
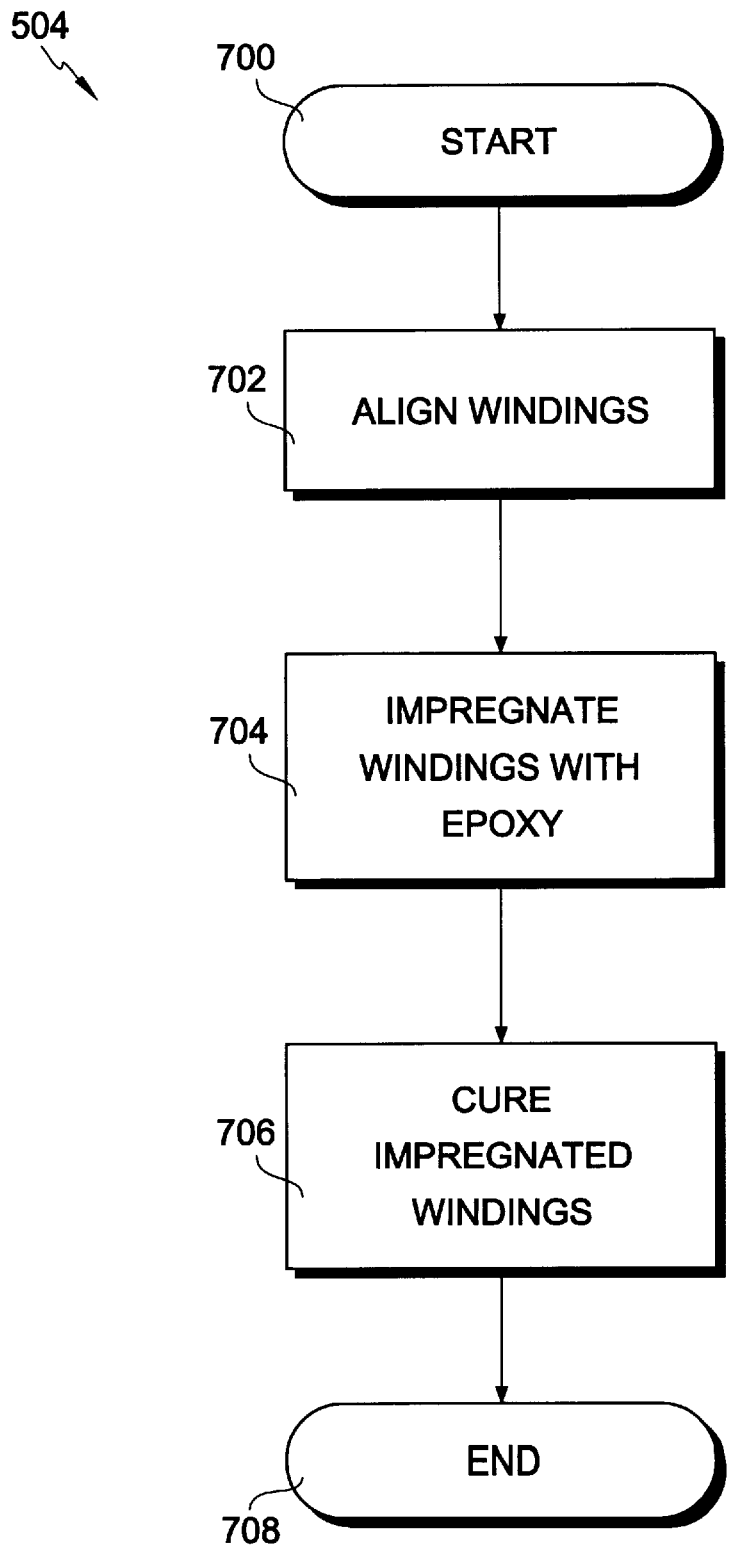
FIG. 7 is a flow at further describing the step of making the winding assembly as shown in FIG. 5 in accordance with the present invention.

FIG. 7 illustrates step 504 of FIG. 5 of making the winding assembly in greater detail beginning at a step 700. Step 702 aligns the regular conductor windings 354 to each other in an overlapping fashion. Once in a desired position, the regular conductor windings 354 are impregnated with an adhesive substance such as epoxy. The adhesive substance is cured in step 706 to form the winding assembly. Clearly, for some adhesive substances, the cure time for step 706 may be quite short but lengthy for others adhesive substances. The embodiment of step 503 ends at a step 708.

The steps 700, 702, 704, 706, and 708 are optional in the construction of the winding assembly. The windings 354 may be combined in other ways to form the armature 300. The steps illustrated in FIG. 7 describe only an embodiment of step 504.

Figure 8:
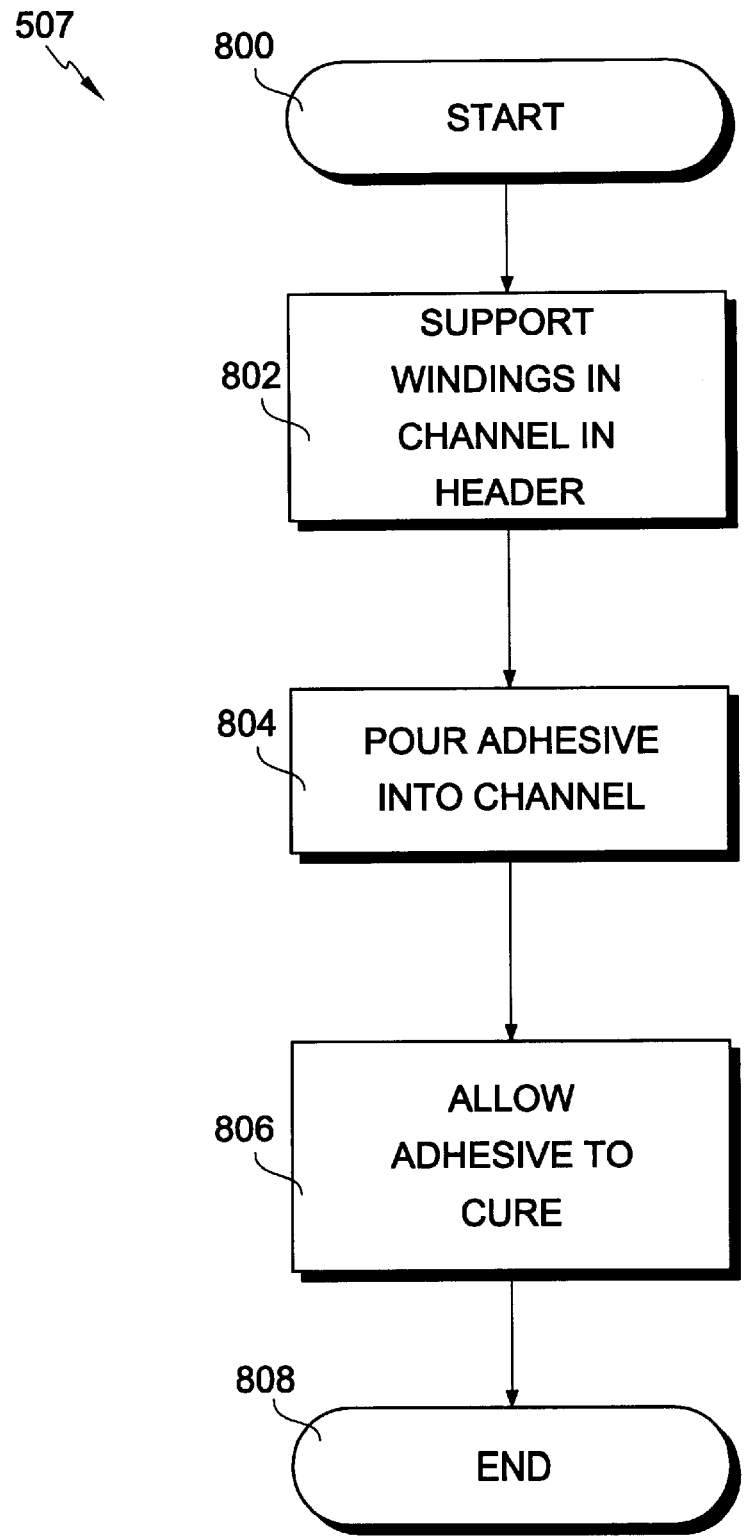
FIG. 8 is a flow chart describing the step of attaching the Winding assembly to the header as shown in FIG. 5 in accordance with the present invention.

Referring now to FIG. 8, step 507 described with reference to FIG. 5 will now be described in more detail beginning with a step 800. To epoxy or attach the winding assembly to the header 304, the regular conductor windings 354 are supported in a channel in the header in step 802. Step 804 pours or applies epoxy or another adhesive substance 368 to the channel in the header 304. While the adhesive substance 368 and the windings 354 are in the channel, the adhesive substance 368, such as epoxy, is allowed to cure in step 806. The embodiment of step 507 illustrated in FIG. 8 ends at a step 808.

This concludes the description of the method 500 of making the armature 300. It is emphasized that the description above only includes a few, and not all, embodiments of the method 500.

Figure 9B:
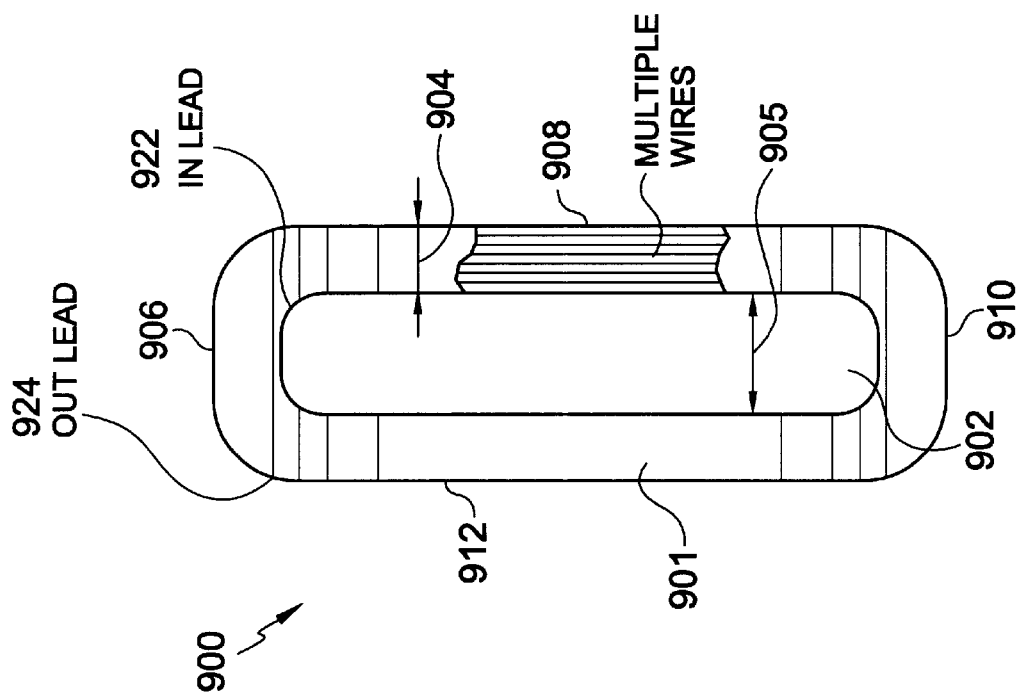
FIGS. 9a–9d illustrate an embodiment of a regular winding for use in an armature in accordance with the present invention.
Figure 9A:
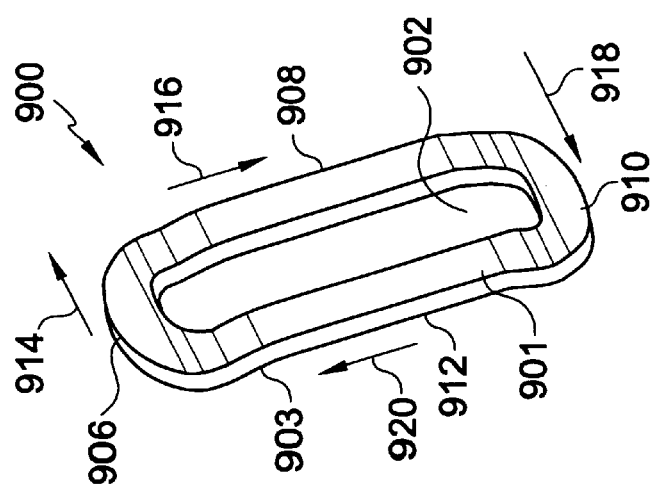
Figure 9C:
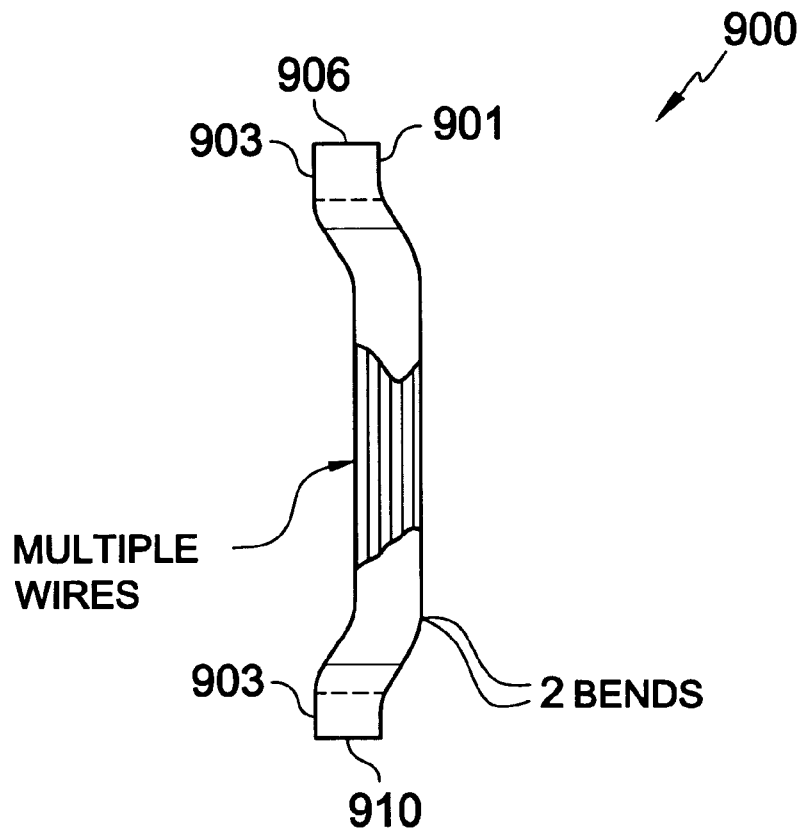
Figure 9D:
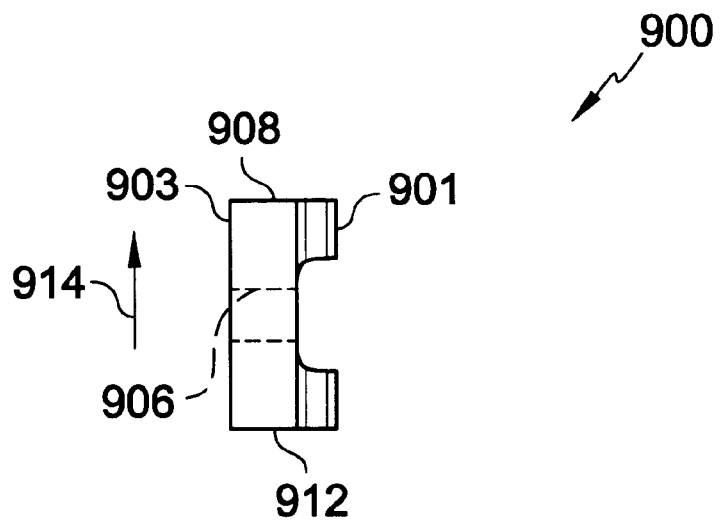

An embodiment of the regular conductor windings 354 and their use in the armature 300 will now be described. FIGS. 9a–9d show an embodiment 900 of the regular conductor windings 354. FIG. 9a shows a perspective view of the regular conductor winding 900. FIG. 9b shows a side view showing a face 901 of the regular conductor winding 900. A face 903 on an opposite side of the regular conductor winding 900 is not shown in FIG. 9b. FIG. 9c is a side end-on view of a regular conductor winding 900 while FIG. 9d is a top end-on view of the regular conductor winding 900.

The regular conductor winding 900 is a conductor arranged to form a toroidal shape which in turn forms an aperture 902. The toroidal shape has an approximately constant cross-section related to a width 904 of the toroidal shape. The toroidal width 904 is necessarily greater than or equal to the width of the conductor. To permit the regular conductor windings 900 to overlap each other to maximize a volume encompassing portions of the regular conductor windings 354 in the armature 300, a width 905 of the aperture 902 is greater than or equal to the toroidal width 904.

The conductor arranged to form the regular conductor winding is any substance or material responsive to electric current. Suitable substances and materials include, but are not limited to: metals such as aluminum, copper, silver, gold, platinum, and tin. Copper and aluminum are preferred in some embodiments for their high conductivity and relatively low cost. The conductor has a round, or oval cross section in some embodiments. In other embodiments, the conductor has a square, rectangular, or flat cross section to facilitate a high conductor density in the regular conductor windings.

The conductor has an electrical insulator to prevent shorting between the various turns of the regular conductor winding. This insulator can be formed in any of various ways such as simply by coating or by oxidizing an insulation layer on a metal conductor. Those skilled in the art will readily appreciate the many other ways of forming an insulator on the conductor.

Although not required by the invention, the embodiment of the regular windings 900 shown in FIGS. 9a–9d has four sides 906, 908, 910, and 912 encircling the aperture 902. Those skilled in the art will readily appreciate that other embodiments of the regular conductor windings 354 may be circular, oval shaped, have three or more sides, or be other shapes topologically equivalent to a torus having modulus one or larger.

In some embodiments, as shown in the embodiment 900, the regular conductor windings 354 may have axes corresponding to the sides. For example, axes 914, 916, 918, and 920 correspond to sides 906, 908, 910, and 912, respectively. As is readily apparent to those skilled in the art, the direction of the axes is irrelevant, but their orientations with respect to their corresponding sides is relevant. In some embodiments, as in the regular winding 900, portions of the toroidal shape that are part of a pair of opposite sides can have two axes respectively that lie substantially in a first plane. For example, axes 916 and 920 may lie in the same plane, and axes 914 and 918 may lie in another plane. Additionally, the axes corresponding to portions of pairs of opposite sides may be substantially parallel.

In some embodiments, there may be other geometrical relationships between the arrangement of portions of the conductor. For example, the width 905 of the aperture 902 may be greater than an integer multiple of the toroidal width 904. In other embodiments, the width 905 of the aperture 902 may be approximately equal to an integer multiple of the toroidal wt 904. In yet other embodiments, the integer may be less than 4. Then, the aperture width or diameter 905 may be greater than 0, 1, 2, or 3 times the first toroidal width, or the width 905 of the aperture 902 may be approximately equal to 0, 1, 2, or 3 times the toroidal width 904.

In yet other embodiments, the approximately constant cross section of the toroidal shape may be a rectangular cross section as shown in the embodiment 900. Also, a length of a side of the rectangular cross section can approximately equal the cross-sectional width 904 as shown in FIG. 9b. Clearly, other geometrical relationships are possible without departing from the invention. The cross section need not be constant. It also may have the same shape but have a changing cross section.

Conductor leads 922 and 924 are part of the conductor arranged to form the toroidal shape of the regular conductor winding 900. The placement of the leads 922 and 924 depends on the particular embodiment of the invention. The leads 922 and 924 are connected to electrical current when used in the armature 300 in the electric motor 350. In some embodiments, the leads 922 and 924 will be connected to other regular windings having the same phase in the armature 300. In some embodiments, the leads 922 and 924 may be directly connected to the terminal 306.

Figure 10A:
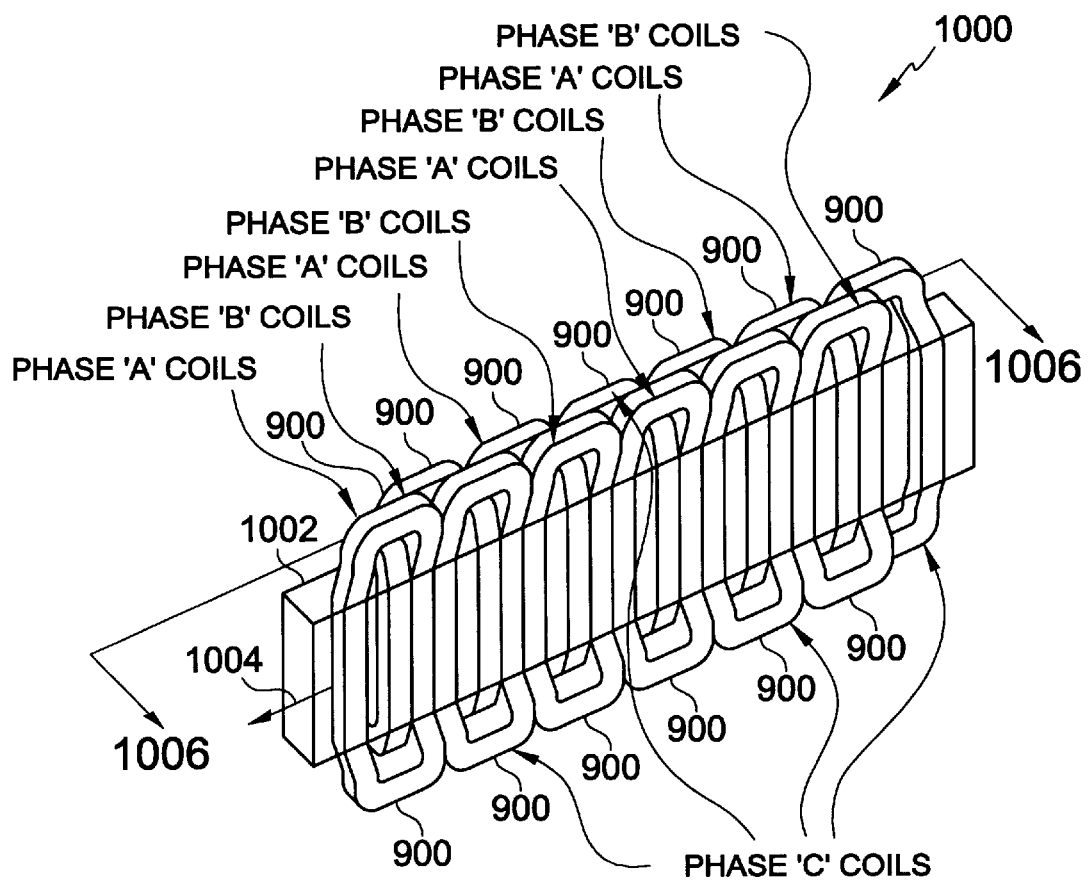
FIGS. 10a–10d illustrate an embodiment of a winding assembly using the regular winding shown in FIGS. 9a–9d in accordance with the present invention.
Figure 10B:
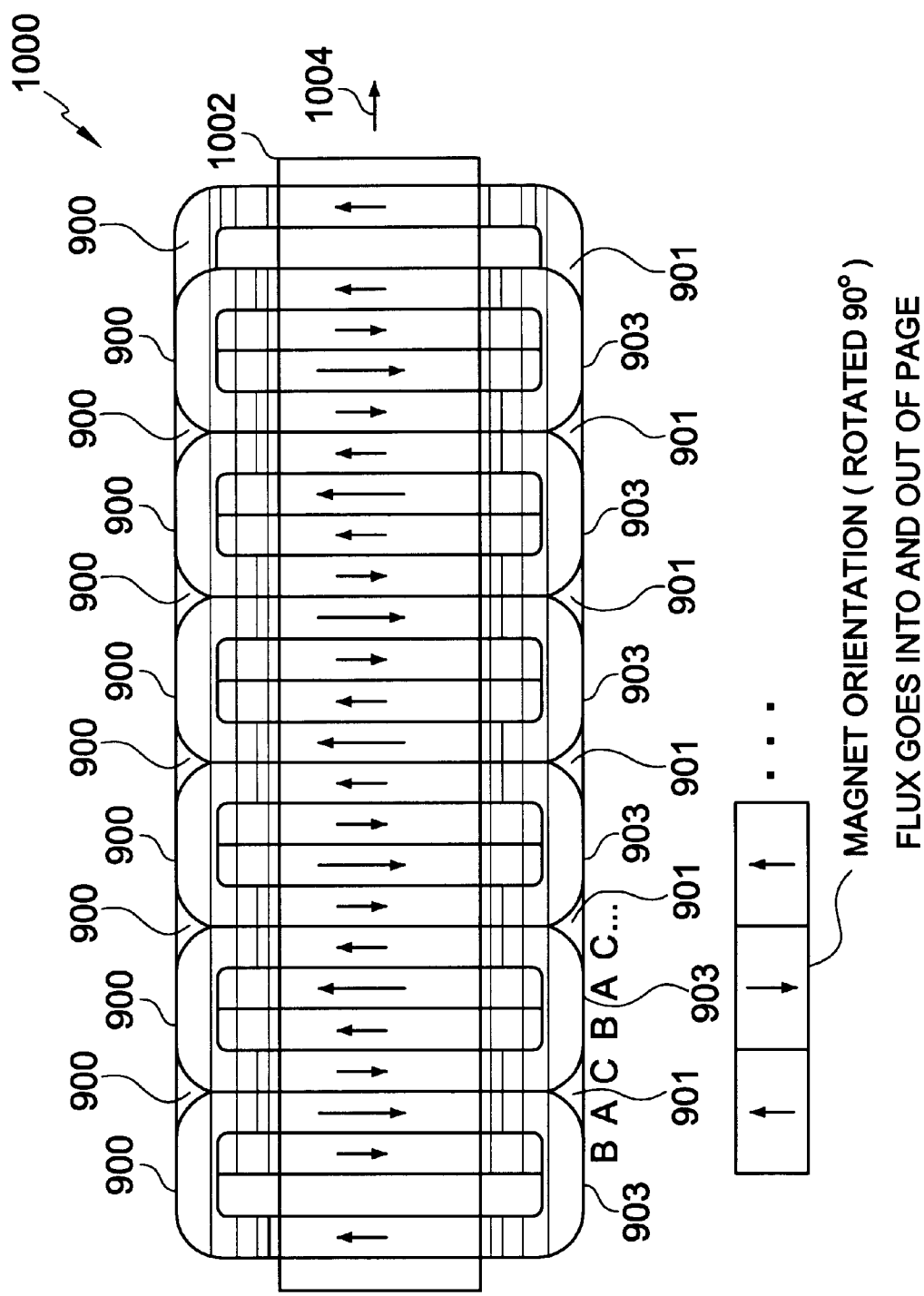
Figure 10C:
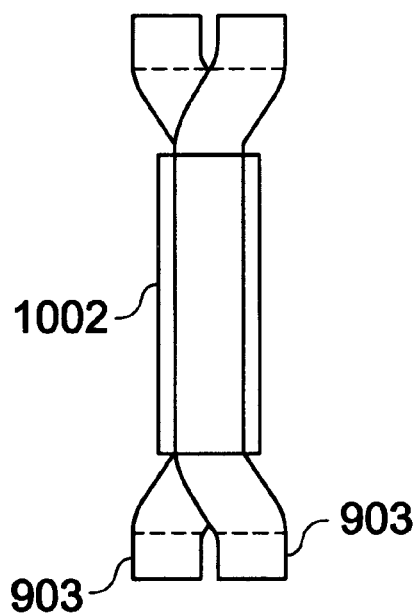
Figure 10D:
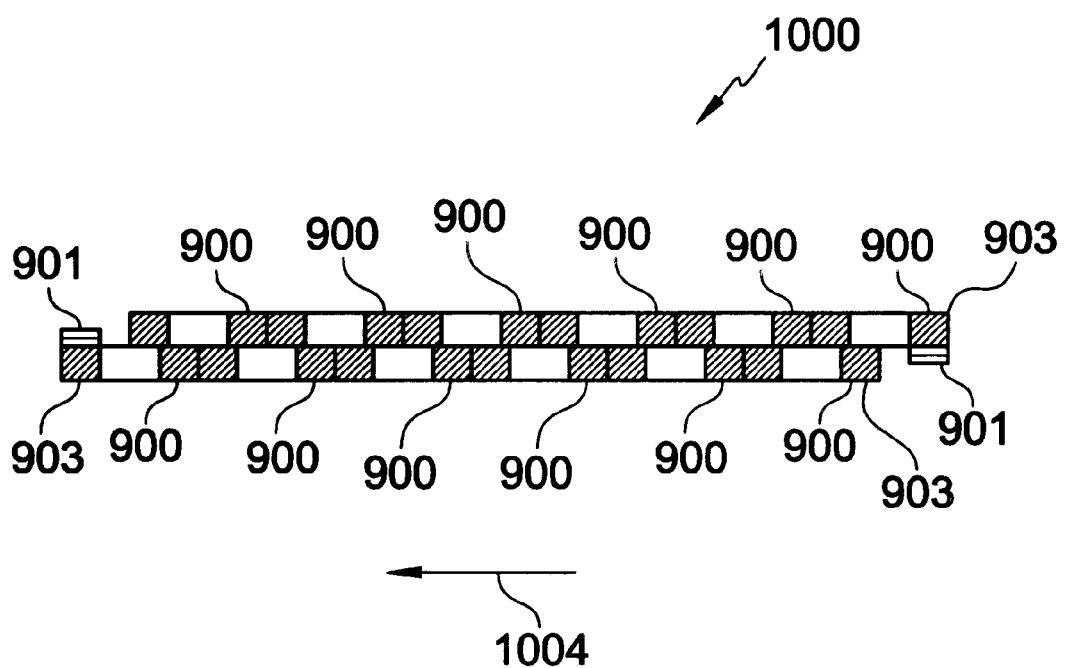

FIGS. 10a–10d show a winding assembly 1000 using regular conductor windings all having approximately the same shape as the embodiment 900 shown in FIGS. 9a–9d. FIG. 10a is a perspective view of the winding assembly 1000, and FIG. 10b is a front side view of the winding assembly 1000. FIG. 10c illustrates a cross-sectional side view of the winding assembly 1000 while FIG. 10d is a top cross-sectional view of the winding assembly 1000.

The winding assembly 1000 contains regular conductor windings 900 responsive to electrical current Each regular conductor winding 900 has approximately the same toroidal shape which forms an aperture. The regular windings 900 are arranged in overlapping fashion to maximize a conductor density within a volume by having a portion of each winding at least partially fill an aperture of an adjacent overlapping winding.

The windings 900 in FIG. 10a have been labeled for an embodiment of the armature 300 as a three-phase armature. The three phases are labeled A, B, and C. In the embodiment in FIG. 10a, the A and B windings fill apertures in the C windings; the B and C windings fill apertures in the A windings; the C and A windings fill apertures in the B windings. This overlapping arrangement results in the phase structure depicted in FIG. 4. It is emphasized that the invention is not limited to phase armatures and winding assemblies.

In a volume 1002 which contains portions of the regular conductor windings 900, windings in different phase groupings or subsets do not substantially overlap each other within the volume 1002. Within the volume 1002, portions of the windings 900 which are part of windings in a phase subset or group are separated from each other by other portions of other windings not in the same phase group or subset. The embodiment depicted in FIGS. 10a–10d shows the number of portions of regular windings separating portions of regular windings in the same phase being less than the number of phases; in the example, the number of phases is three, and the number of separating portions is two. The portions which separate the portions in the same phase group (e.g. group A) are part of regular windings in other phase groups (e.g. groups B and C) as shown in FIG. 4.

The windings 900 in the embodiment 1000 are arranged along an axis 1004. The regular windings are arranged alternately opposing each other about the axis 1004. FIG. 9b shows a face 901 of the regular conductor winding 900. In the embodiment 1000, an inner face 901 of each regular winding 900 is juxtaposed a corresponding inner face of an adjacent regular winding 900.

The winding assembly 1000 shown in FIGS. 10a–10d may be a result of step 504 shown in FIG. 5 of making the winding assembly 1000. Thus, considering also FIGS. 6 and 7, the windings 900 may be pressed or glued together. They may also be electrically connected to each other. FIG. 10d shows a cross section along an axis 1006 in FIG. 1a. The cross section in FIG. 10d then is not within the volume 1002 shown in FIGS. 10a–10c and may not coincide with the axis 1004.

FIGS. 11a–11c show the winding assembly for armature 1000 with thermal insulators 356, 358, 360, 362, and 364, as discussed in FIG. 3b. The thermal insulators 358, 360, 362, 364, may be made from the same material or different materials. FIG. 11a is a perspective view of the winding assembly 1000 with the thermal insulators. FIG. 11b is a front side view of the winding assembly 1000 with the thermal insulators, and FIG. 11c is a cross-sectional end-on side view of the winding assembly 1000 with the thermal insulators. The winding assembly with the insulators as depicted in FIGS. 11a–11c may be the result of a step 505 discussed with reference to FIG. 5.

Figure 12A:
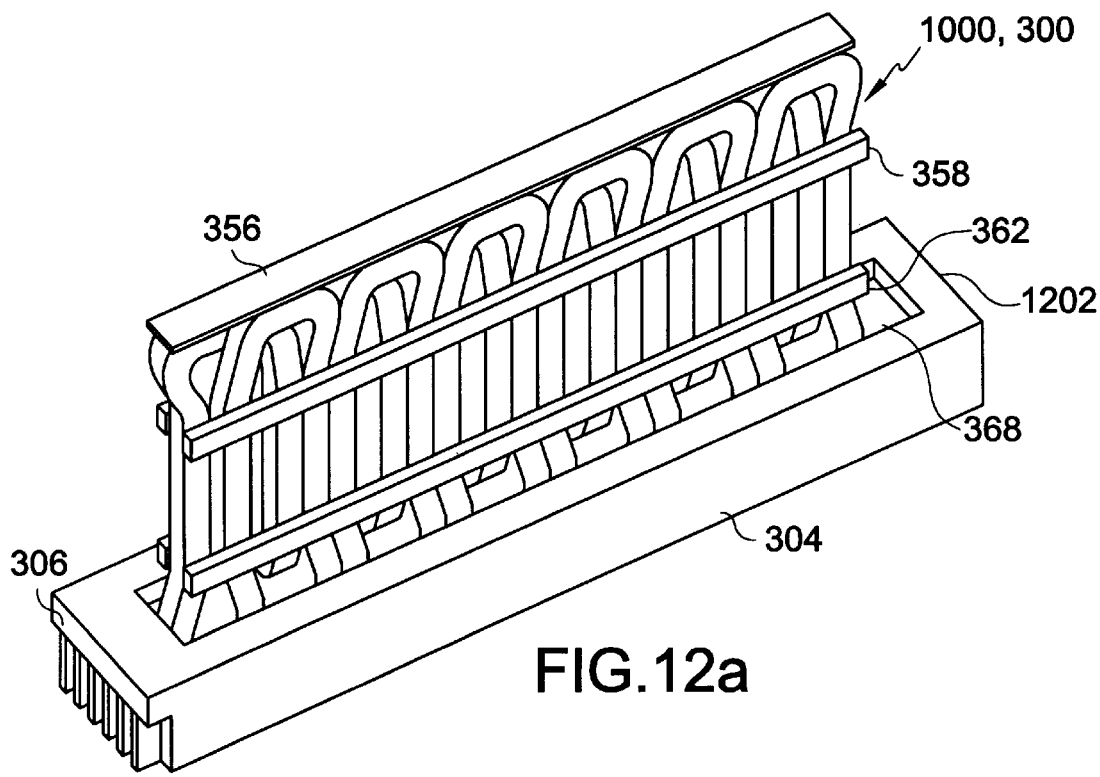
FIGS. 12a–12d illuminate an embodiment of an armature in accordance with the present invention.
Figure 12B:
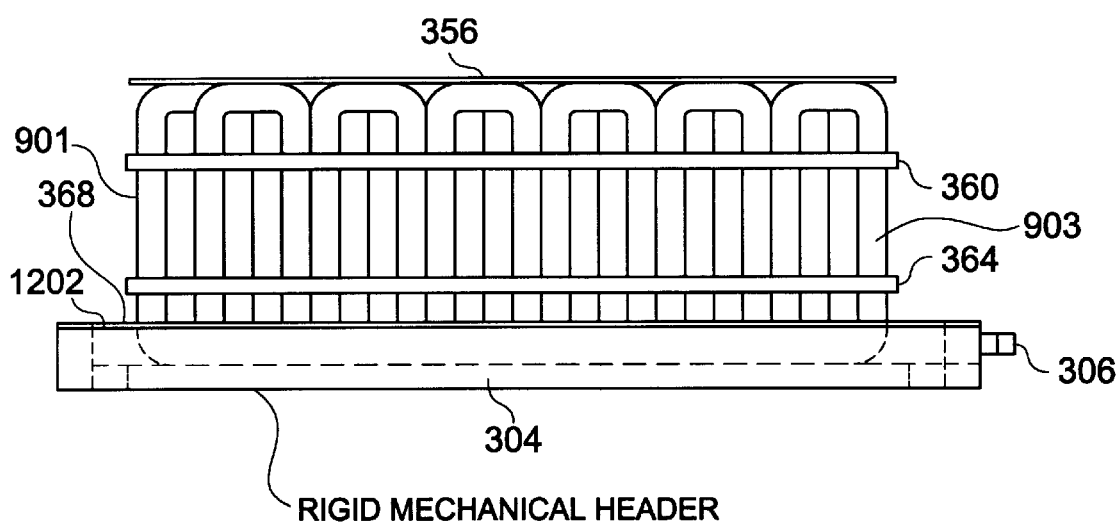
Figure 12C:
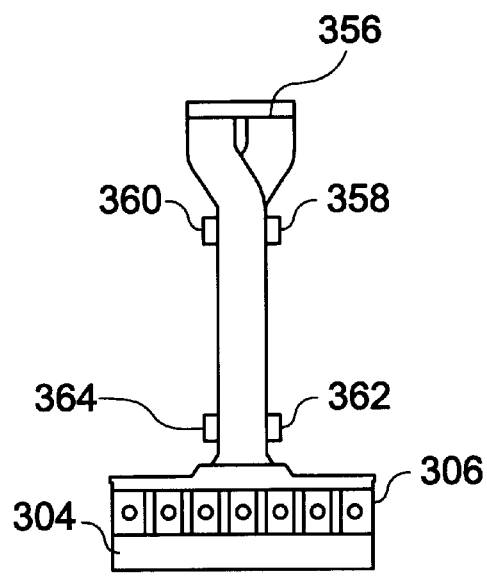
Figure 12D:
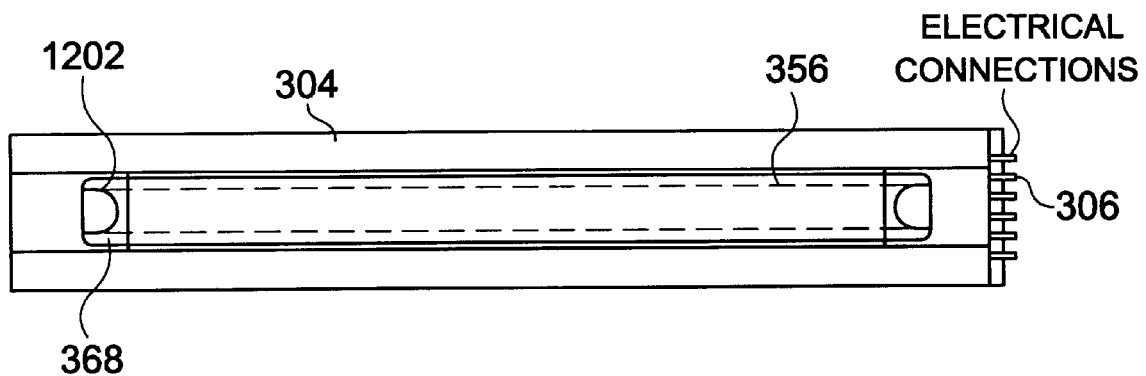

FIGS. 12a–12d illustrate the winding assembly 1000 attached to a header 304 and terminal 306 to form the armature 300 without the enclosure 302. FIG. 12a is a perspective view of the armature 300. FIG. 12b is a front side view of the annature 300 white FIG. 12c is an end-on side view of the armature 300. FIG. 12d shows a top view of the armature 300. FIG. 12a is upside down when compared with the winding assembly 1000 shown in FIG. 11a and the armature 300 in FIG. 3a. The winding assembly 1000 resides in a channel 1202 within the header 304. The adhesive substance 368, such as epoxy, resides within the channel 1202 and attaches the winding assembly 1000 to the header 304, The regular conductor windings 900 are electrically connected or coupled to the terminal 306. The arrangement shown in FIGS. 12a–12d may be the result of a stop 507 as discussed with reference to FIG. 5.

Figure 13:
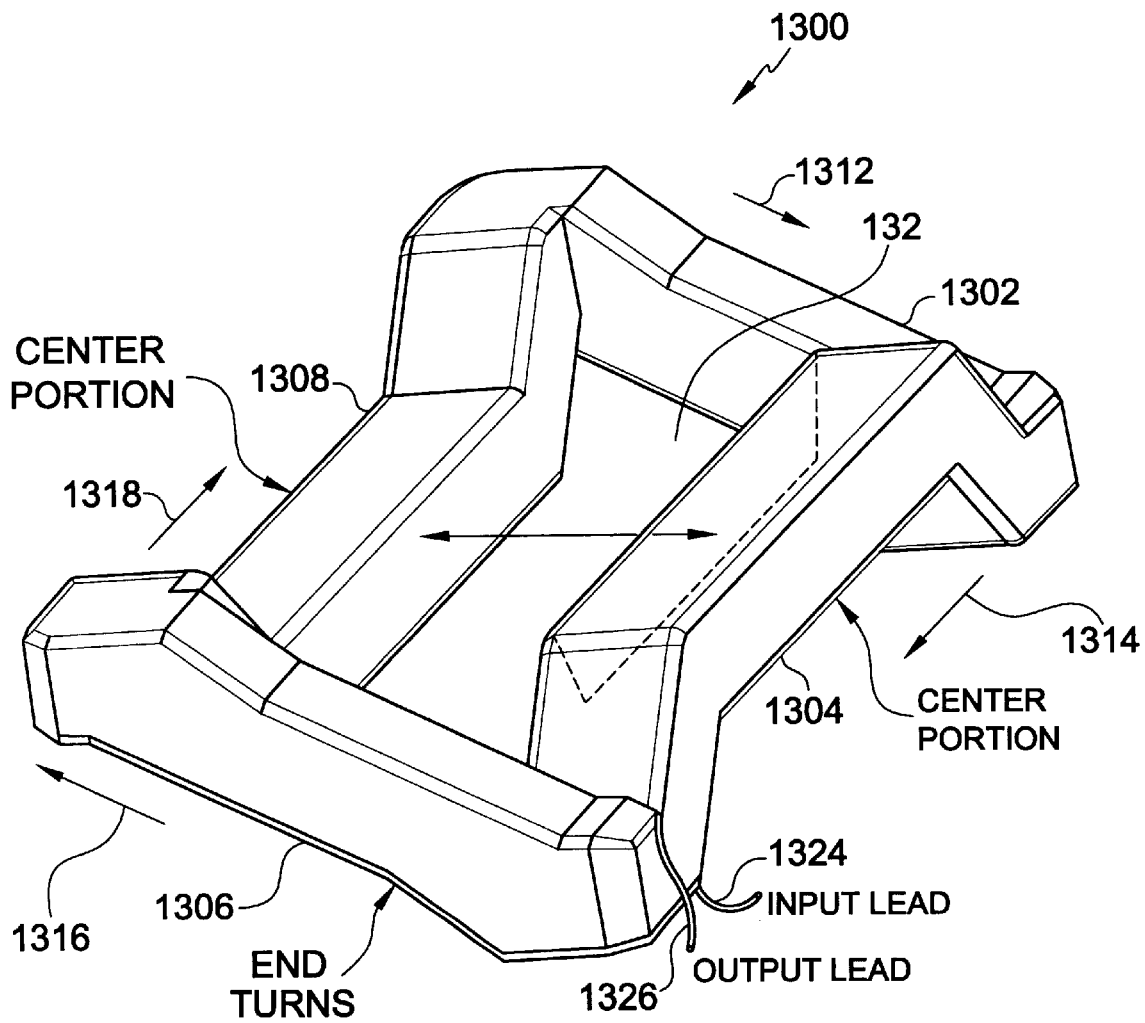
FIG. 13 illustrates an embodiment of a regular winding in according with the present invention.

FIG. 13 shows a perspective view of a second embodiment 1300 of the regular conductor windings 354 discussed with reference to FIG. 3. As with the embodiment 900, the regular conductor winding 1300 has a toroidal shape forming an aperture 1320. A toroidal width 1322 is greater than or equal to a width of the conductor. The embodiment shown in FIG. 13 has multiple turns of the conductor forming the toroidal shape. The terminate in an input lead 1324 and an output 1326. In the embodiment shown, the cross section is constant for sides 1304 and 1308 with the cross sections approximately equaling each other. However, the invention is not limited to having sides with constant cross sections or to sides 1304 and 1308 having the same cross section. To permit the regular conductor windings 1300 to overlap each other to maximize a volume encompassing portions of the regular conductor windings 354 in the armature 300, a width or diameter 1327 of the aperture 1320 is greater than or equal to the toroidal width 1322.

As with the embodiment 900 in FIGS. 9a–9d, the regular conductor winding 1300 has four sides 1302, 1304, 1306, and 1308. Each of the four sides has corresponding axes 1312, 1314, 1316, and 1318. As with the embodiment 900, the direction of the axes is irrelevant, but the orientation relative to their corresponding sides is relevant. The conductor has an insulator to prevent shorting between turns of the conductor. The axes 1302 and 1306 may lie in the same plane, and axes 1304 and 1308 may lie in another plane. Additionally, the axes corresponding to portions of pairs of opposite sides may be substantially parallel.

Conductor leads 1324 and 1326 are part of the conductor arranged to form the toroidal shape of the regular conductor winding 1300. The placement of the leads 1324 and 1326 depends on the particular embodiment of the invention. The leads 1324 and 1326 are connected to electrical current when used in the armature 300 in the electric motor 350. In some embodiments, the leads 1324 and 1326 will be connected to other regular windings having the same phase in the armature 300.

Figure 14A:
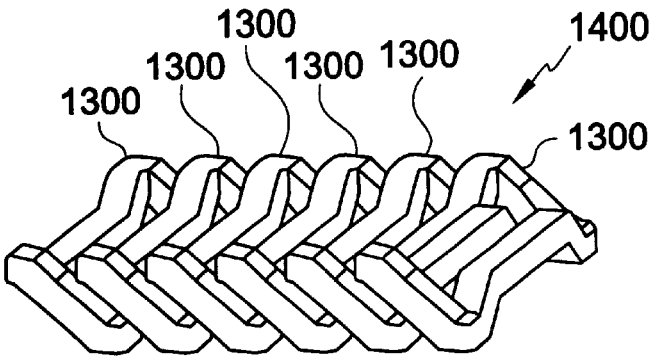
FIGS. 14a–14d illustrate an armature having a regular winding as shown in FIG. 13 in according with the present invention.
Figure 14B:
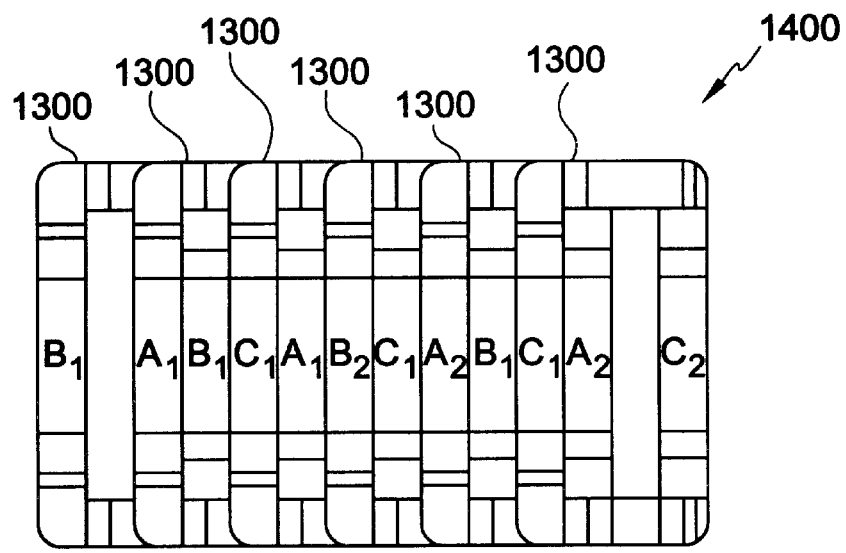
Figures 14C, 14D:
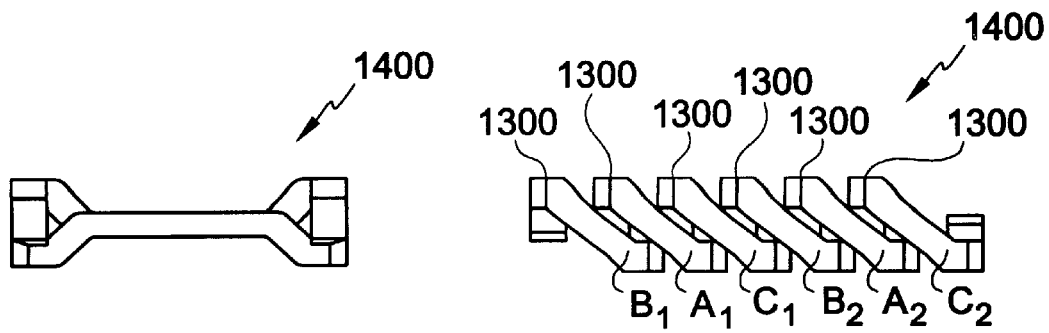

FIGS. 14a–14d illustrate an embodiment of a winding assembly 1400 utilizing the regular conductor winding 1300. This winding assembly 1400 may be used in the armature 300. FIG. 14a is a perspective view of the winding assembly 1400. FIG. 14b is a front side view of the winding assembly 1400 while FIG. 14c is an end-on side view of the winding assembly 1400. FIG. 14d is a top view of the winding assembly 1400. When used in a three-phase armature 300 of the invention, the winding assembly 1400 will have the phase structure shown in FIG. 4. This was the same phase structure for the winding assembly 1000 having three phases.

By increasing the conductor density in the armature residing between the pairs of opposing magnets, the invention dramatically improves efficiency of the electric motor, measured as force output compared with a square root of power dissipation in the windings. In some embodiments, approximately a fifty per cent increase in conductor density of the regular windings compared with conventional windings is achieved with a commensurate increase m conductor density within the magnet gap. In a typical conventional motor, the conductor density within the the magnet gap may be less than fifty per cent by volume. The invention permits high conductor densities, construed herein to mean densities of greater than fifty per cent by volume, between the magnet gap and within the individual regular windings. In some embodiments, conductor densities within the regular windings exceeds ninety per cent and conductor densities within the magnet gap are approximately greater than sixty-five per cent. By improving the density within the magnet gap by roughly fifty per cent in some embodiments, electric motors of the invention have roughly two-thirds the power dissipation of conventional electric motors.

Another advantage of this invention is that all of the individual coils are approximately the same. This makes the armature and motor simpler to manufacture By having one shape for several or all of the regular conductor windings in the armature or motor, problems of precise alignment of windings, particularly in a multiphase armature, are obviated. The invention's multiphase armature does not require two windings of the same phase to overlap and align as in conventional design.

Although only a few exemplary embodiments of this invention have been described in detail above, those skilled in the art will readily appreciate that many modifications are possible in the exemplary embodiments without materially departing from the novel teachings and advantages of this invention. For example, the conductor arranged to form the regular conductor windings may be a metal such as copper or silver, or any substance or material responsive to electrical current. Also, although depicted above as lying roughly along a straight line, the armature may be curved. Similarly, the armature may have different axes along different portions or segments of the armature. The electric motor need not be a linear electric motor. Various stages in the making of the regular conductor winding and the armature described above may be permuted or excluded. Accordingly, all such modifications are intended to be within the scope of the following claims.

What is claimed is:

1. An armature comprising:

a plurality of regular windings, each of said plurality of regular windings responsive to electrical current and having approximately a same shape, said shape forming an aperture, said plurality of regular windings arranged in overlapping fashion and having a portion of said each winding at least partially fill an aperture of an adjacent overlapping winding;

an enclosure surrounding said plurality of regular windings; and at least one thermal insulator disposed between a portion of said plurality of regular windings and a portion of said enclosure to prevent heat transfer between said plurality of regular windings and said enclosure and to form a gap between remaining portions of said windings and said enclosure where said at least one thermal insulator is not disposed;

wherein a subset of said plurality of regular windings is assigned to a phase such that windings in said subset substantially do not overlap each other within a volume.

2. An armature as in claim 1 wherein said plurality of windings is a multiplicity of windings having a number of phases such that said portions which are part of windings in said subset are separated from each other by other portions of windings not in said subset.

3. An armature as in claim 2 wherein a number of said other portions of windings is less than said number of phases.

4. An armature as in claim 3 wherein said number of said other portions is said number of phases minus one.

5. An armature as in claim 1 wherein said plurality of regular windings is arranged along an axis.

6. An armature as in claim 5 wherein said plurality of regular windings are arranged alternately opposing each other about said axis.

7. An armature as in claim 1 wherein said enclosure has a shape determined in accordance with a shape of said plurality of regular windings.

8. An armature as in claim 6 further comprising an adhesive binding said plurality of regular windings together.

9. An armature as in claim 1 further comprising:

a header supporting said plurality of regular windings; and an adhesive attaching said plurality of regular windings to said header.

10. An armature as in claim 9 wherein said header has a channel, and at least one of said adhesive and further portions of said regular windings are disposed in said channel.

11. An armature as in claim 9 wherein said adhesive is epoxy.

12. An armature as in claim 9 wherein said adhesive thermally insulates said plurality of regular windings from said header.

13. A method of making an armature, the method comprising:

arranging a plurality of regular windings each of said plurality of regular windings having approximately a same shape and being responsive to electrical current, said shape forming an aperture, in overlapping fashion by at least partially filling an aperture of a winding adjacent and overlapping said each winding with a portion of said each winding wherein a subset of said plurality of regular windings is assigned to a phase such that windings in said subset substantially do not overlap each other within a volume;

impregnating said plurality of regular windings with an adhesive to bind said plurality of regular windings to each other;

surrounding said plurality of regular windings with an enclosure; and disposing at least one thermal insulator between a portion of said plurality of regular windings and a portion of said enclosure to prevent heat transfer between said plurality of regular windings and said enclosure and to form a gap between remaining portions of said windings and said enclosure where said at least one thermal insulator is not disposed.

14. A method of making an armature as in claim 13 further comprising encircling a wire to form said each winding.

15. A method of making an armature as in claim 13 further comprising pressing each winding of said plurality of windings.

16. A method of making an armature as in claim 13 further comprising attaching said coil assembly to a header.

17. A method of making an armature as in claim 16 wherein said attaching includes applying an adhesive to said header and said coil assembly.

18. An electric motor comprising:

a plurality of periodically spaced magnetic fields; and an armature having a plurality of regular conductor windings, each of said plurality of regular conductor windings having approximately a same shape, said plurality of regular conductor windings arranged in overlapping fashion wherein regular conductor windings in a phase group substantially do not overlap each other, such that when electrical current is applied to said plurality of regular conductor windings, said electrical current interacts with said plurality of periodically spaced magnetic fields to cause said armature to move relative to said plurality of periodically spaced magnetic fields, said armature further comprising an enclosure surrounding said plurality of regular windings and at least one thermal insulator disposed between a portion of said plurality of regular windings and a portion of said enclosure to prevent heat transfer between said plurality of regular windings and said enclosure and to form a gap between remaining portions of said windings and said enclosure where said at least one thermal insulator is not disposed;

a header having a channel therein, a portion of said armature being inserted into said channel; and an adhesive substance within said channel, said adhesive substance binding said portion of said armature to said header.

19. An electric motor of claim 18 wherein said plurality of periodically spaced magnetic fields have a period distance such that a portion of a regular conductor winding in the phase group is separated from a corresponding portion in a next regular conductor winding in the phase group by a multiple of the period distance.

20. An electric motor of claim 18 wherein said plurality of periodically spaced magnetic fields are associated with a plurality of periodically spaced pairs of magnets, each magnet in each pair facing the other magnet in the pair to align their respective magnetic fields and form a space therebetween.

* * * * *

UNITED STATES PATENT AND TRADEMARK OFFICE
CERTIFICATE OF CORRECTION

PATENT NO.   : 6,140,734
DATED        : October 31, 2000
INVENTOR(S)  : Andrew J. Hazelton et al.

It is certified that error appears in the above-identified patent and that said Letters Patent is hereby corrected as shown below:

<u>Title page,</u>
Item [56], References Cited - FOREIGN PATENT DOCUMENTS, insert -- 62,296,763   12/24/87   Japan
8-275,489      10/18/96   Japan --.

Signed and Sealed this

Thirtieth Day of July, 2002

*Attest:*

*Attesting Officer*

JAMES E. ROGAN
*Director of the United States Patent and Trademark Office*